United States Patent
Dey et al.

(10) Patent No.: US 12,373,225 B2
(45) Date of Patent: Jul. 29, 2025

(54) BATCH PROCESSING DURING BOT RUNTIME

(71) Applicant: SAP SE, Walldorf (DE)

(72) Inventors: Satyadeep Dey, Bangalore (IN); Vinay Kumar, Bangalore (DE); Sharmika Parmar, Walldorf (DE); Sudha Karanam Narasimha Murthy, Walldorf (DE); Gagan K, Walldorf (DE); Chandrakanth S, Walldorf (DE); Mithilesh Kumar Singh, Ara (IN); Suvajit Dutta, Walldorf (DE)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 17/550,156

(22) Filed: Dec. 14, 2021

(65) Prior Publication Data

US 2023/0185586 A1    Jun. 15, 2023

(51) Int. Cl.
*G06F 9/445* (2018.01)
*G06F 11/3604* (2025.01)

(52) U.S. Cl.
CPC ...... *G06F 9/44589* (2013.01); *G06F 11/3612* (2013.01)

(58) Field of Classification Search
None
See application file for complete search history.

(56) References Cited

U.S. PATENT DOCUMENTS

| | | | |
|---|---|---|---|
| 2004/0194065 A1* | 9/2004 | McGrath | G06F 9/44 717/124 |
| 2018/0359132 A1* | 12/2018 | Salameh | G06F 16/95 |
| 2021/0103767 A1* | 4/2021 | Berg | G06V 10/762 |
| 2022/0107622 A1* | 4/2022 | Monakova | G05B 19/4155 |
| 2022/0391225 A1* | 12/2022 | Grigore | G06F 9/451 |

* cited by examiner

*Primary Examiner* — Lewis A Bullock, Jr.
*Assistant Examiner* — Mark A Gooray
(74) *Attorney, Agent, or Firm* — Buckley, Maschoff & Talwalkar LLC

(57) ABSTRACT

Provided are systems and methods for batching instructions of a bot during execution/runtime of the bot. The bot may be a software program that is designed to perform user interface interactions (e.g., button clicks, opening/closing pages, text entry, etc.) in place of a human. In one example, a method may include receiving a request to execute a bot program configured to perform a sequence of actions on a user interface of a software application, identifying a plurality of actions of the bot program that can be batched, assembling a plurality of instructions for performing the plurality of actions of the bot program into a batched payload, and transmitting an automation request with the batched payload to a back-end of the application on a server.

17 Claims, 7 Drawing Sheets

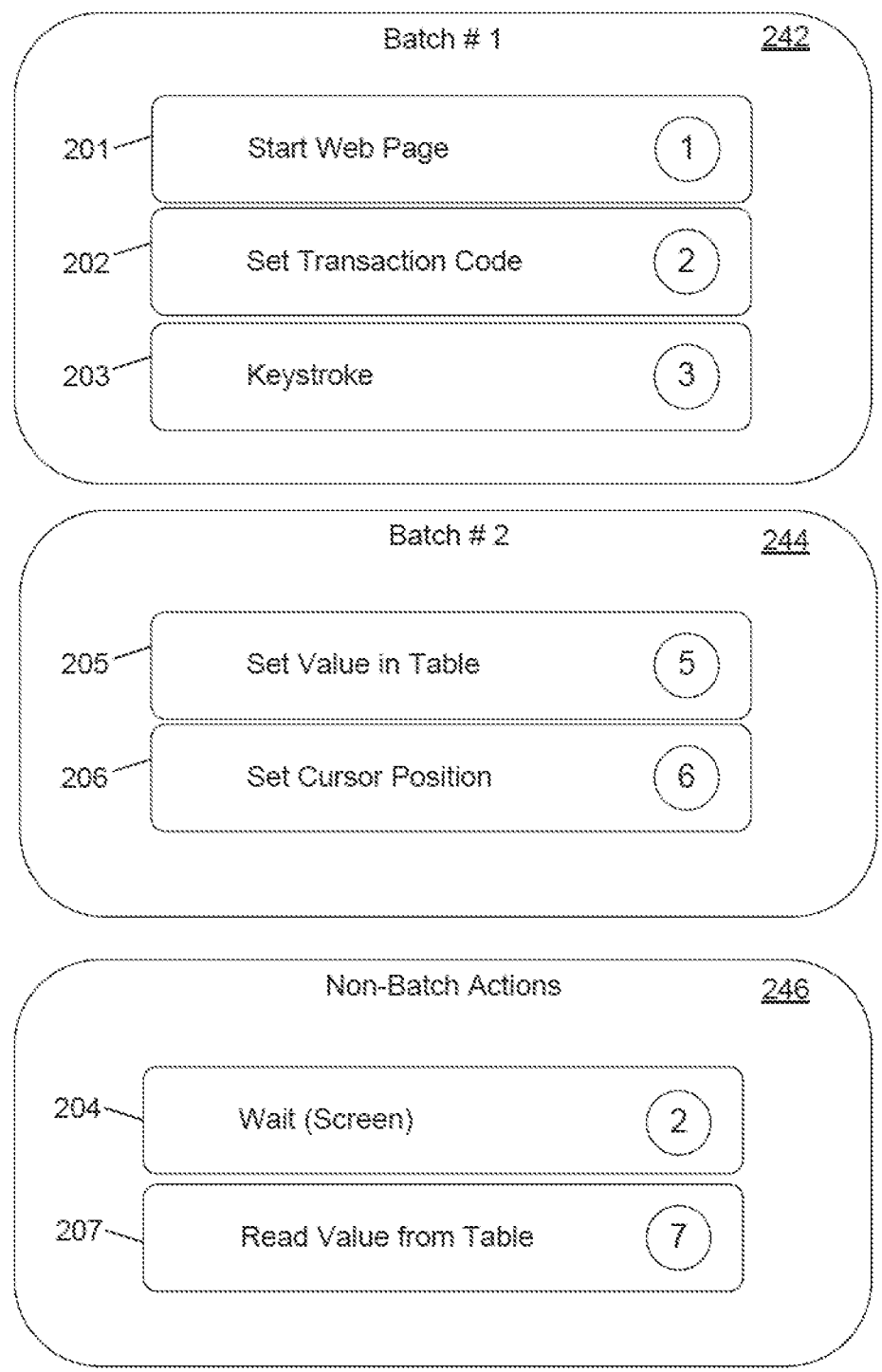

FIG. 2C
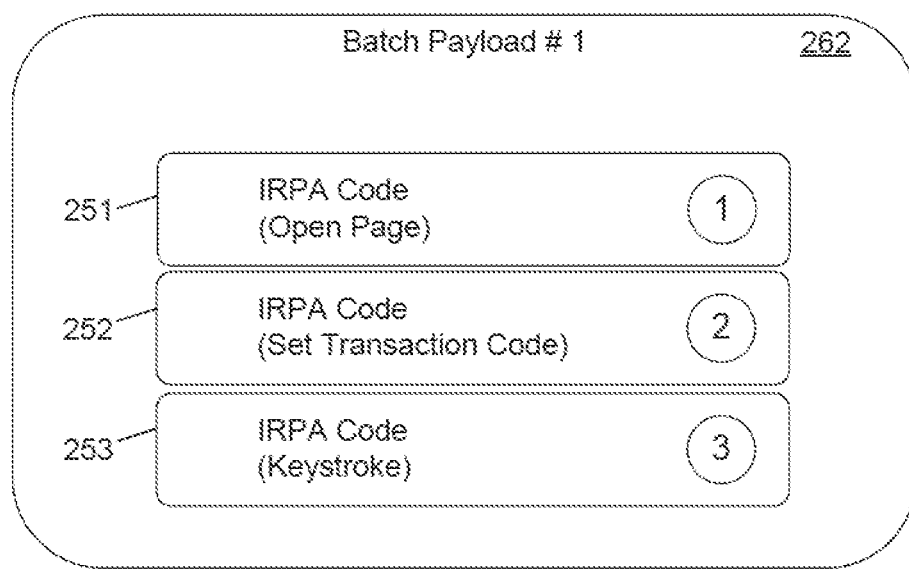
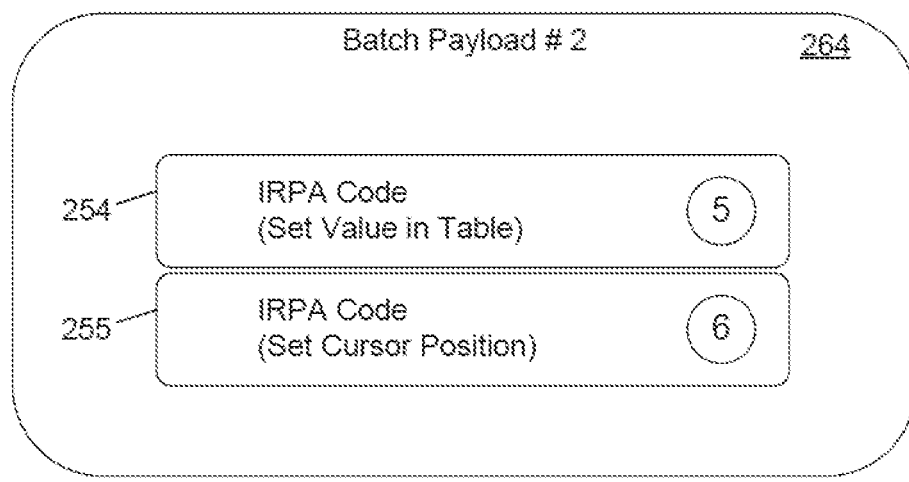

FIG. 3A

Code (Without Batching)     300A

```
await  /— 301A
$.Access.screens.s_createSalesDocuments.wait();

await  /— 302A
$.Access.screens.s_createSalesDocuments.elements.
e_orderType.set("APOR");

await  /— 303A
$.Access.screens.s_createSalesDocuments.elements.
e_orderType.setTransaction Code;
```

FIG. 3B

304     Code (With Batching)     300B

```
await irpa_webgui.batch(async()=>{ await  /— 301B
    $.Access.screens.s_createSalesDocuments.wai
    t();

await  /— 302B
    $.Access.screens.s_createSalesDocuments.ele
    ments.e_orderType.set("APOR");

await  /— 303B
    $.Access.screens.s_createSalesDocuments.ele
    ments.e_orderType.setCursorPosition(0);
});
```

BATCH PROCESSING DURING BOT RUNTIME

BACKGROUND

WebGUI, also referred to as WEBGUI and SAP GUI for hypertext markup language (HTML), is an implementation model for screen-based software applications that allows users to run dialog transactions directly in a web browser. WebGUI may dynamically provide user interfaces/screens in the web browser for transactional processing such as entering data into fields, opening pages, moving a cursor, clicking buttons, checking boxes, and the like. WebGUI relies on a client-server architecture in which a client-side or front-end of an application communicates with a server-side or back-end of the application to render content within a graphical user interface at the front-end.

Recently, robotic processing automation (RPA) has gained attention for its ability to create bot programs that can perform automated user interface actions on a user interface of a software application (e.g., a WebGUI-based application, etc.) in place of a user. For example, a bot program can automatically read the data, enter the data, submit data, check boxes and buttons, make other selections, open pages, click on links, and the like. However, bot execution is not very efficient because each instruction is typically executed in sequence.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 2B is a diagram illustrating a process of dividing the sequence into different subsets of instructions in accordance with an example embodiment.

FIG. 2C is a diagram illustrating a process of generating a batch payload for a bot program in accordance with an example embodiment.

FIG. 3A is a diagram illustrating bot programming code without batching in accordance with an example embodiment.

FIG. 3B is a diagram illustrating bot programming code with batching in accordance with an example embodiment.

DETAILED DESCRIPTION

Figure 1:
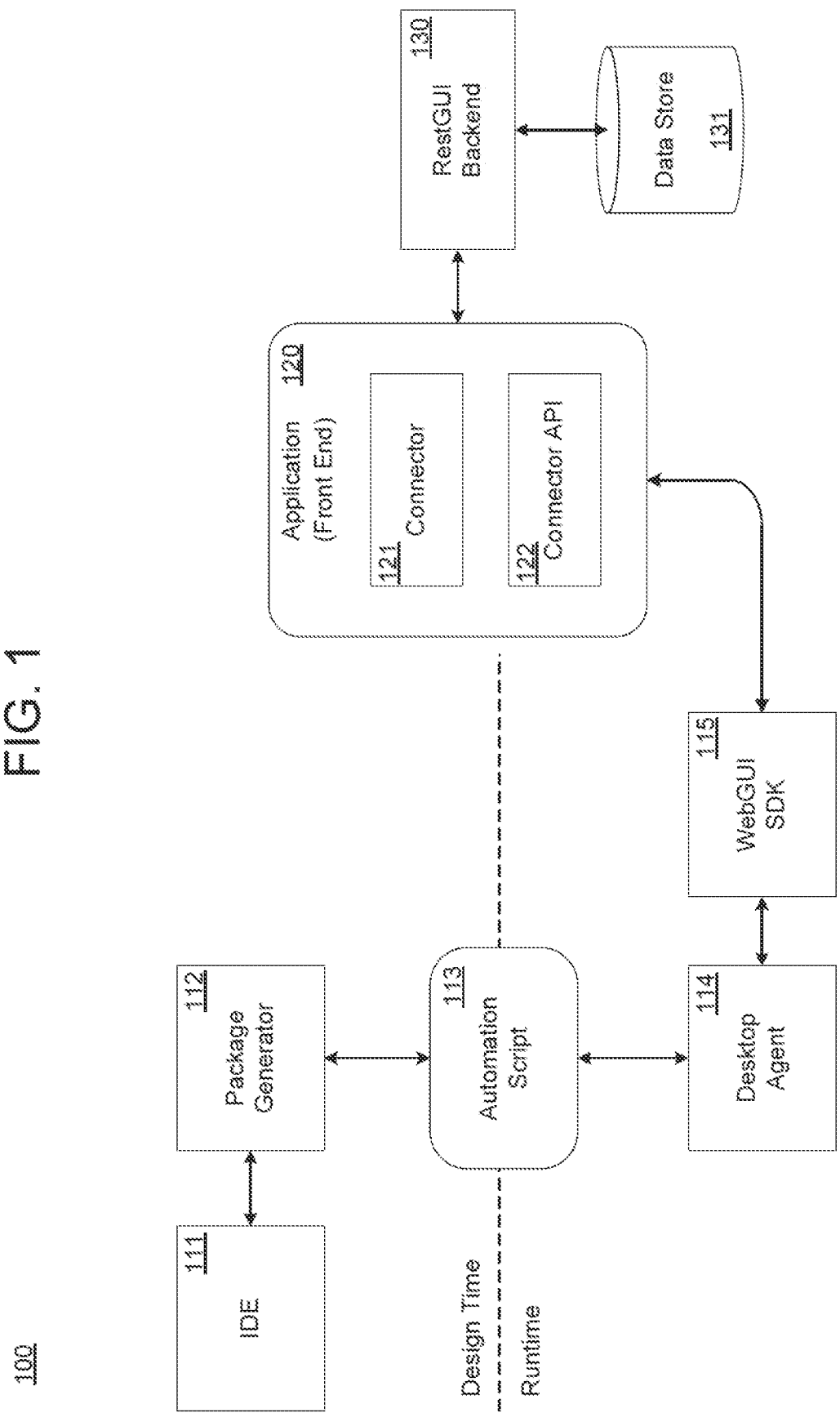
FIG. 1 is a diagram illustrating a computing environment for application development and execution in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Robotic processing automation (RPA) has gained attention for its ability to create bot programs that can perform automated user interface actions on a user interface of a software application (e.g., a WebGUI-based application, etc.) in place of a user. For example, a bot program can automatically read data, enter data, submit data, click on boxes and buttons, make other selections, open pages, click on links, and the like. Robotic processing automation may provide or otherwise access a recorder widget that can record the events on the user interface and then replay the events in the order they are recorded.

RPA may be used to generate software bots that automate repetitive manual-based processes that are performed within a user interface of a software application via a computer. For example, rather than a human reading data from a source or multiple sources and entering them into fields of the user interface, a bot can be programmed to perform the same process automatically. Some of the benefits of the bot include systematizing time-consuming manual activities which significantly increase the speed at which such processes are performed. Furthermore, bots remove the possibility of human error in the data entry thereby ensuring that the data being entered is correct. Bots can open applications, click buttons, set values, close windows, etc. Furthermore, a bot can be programmed to open database tables, read values at specific locations in the tables, store values, etc. Once developed, a bot can be activated and run in a runtime environment of a host platform.

The example embodiments are directed to a system that can batch together bot instructions for executing the bot via a software application into a single payload and submit the payload to a back-end (server-side) of the software application. For example, the instructions may refer to all actions of the bot that can be batched together on a single page of the application. In response, the server can process the batch instructions and return a batch of responses for rendering on the screen. The batching process enables significantly faster bot execution. In some cases, bot actions are dependent on one another. For example, a data value may be read from a table during a first step and then stored within a text-input field of a user interface during a second step. However, many bot actions are independent of one another. The system described herein can identify which bot actions are capable of being batched together and which are not. The system then separates the instructions which can be batched and submits them as a batch to the server.

As an example, the software application may be a WebGUI application such as an SAP GUI for HTML application. WebGUI relies on a client-server architecture in which a client-side or front-end of a software application communicates with a server-side or back-end of the software application to render content within a graphical user interface on the client-side. WebGUI is one of the Internet Transaction Server (ITS) implementation models for screen-based applications that allow users to run SAP dialog transactions directly from a Web browser, the other two models including SAP GUI for Windows and SAP GUI for Java. This model automatically maps the screen elements in SAP transactions to HTML using $HTML^{Business}$ functions implemented inside the ITS. Each $HTML^{Business}$ function handles a different screen element and uses the screen attributes to position HTML controls at the same position on the HTML page as on the system screen. With WebGUI, the user interacting with the screen needs little or no knowledge of HTML, $HTML^{Business}$, or JavaScript. Also, the user does not have to be familiar with the software development environment, because the WebGUI generates the required templates to automatically run a WebGUI application.

In the example embodiments, a recorder widget may connect to a session between a front-end and a back-end of a WebGUI software application during bot development, capture and record the user interface actions on the front-end of the WebGUI application and the instructions that are sent to the back-end of the WebGUI application, record the responses from the server, and build/develop a bot based on the recorded user interface actions. For example, the recorder may connect to a session between a front-end and a back-end of the software application via a web extension. However, it should be appreciated that the embodiments are not limited to a web extension. That is, the example embodiments may be implemented via a more traditional recorder architecture.

RESTGUI is a protocol that works as a bridge between a front-end of a WebGUI application (client-side) and a back-end of the WebGUI application (server-side). RESTGUI provides an interface/mechanism such as an application programming interface (API) which exposes the session between the client and the server and enables the web extension to subscribe to events at the back-end. Whenever a request comes in from the front-end of the WebGUI application, the request is sent as is to the backend. Here, the backend has an ITS layer that translates the data. The RESTGUI interface exposes a request/response mechanism between the client and the server such that the web extension can subscribe to specific events at the server and receive notifications of those events from the server. For example, the client can send a request directly to the backend with some special notations and they represent each control item with IDs, formatting, and the whole thing is readable at the server side because of this layer. In this example, the application may be displayed/posted in the web browser. The web extension is side-by-side with the web application logically.

The web extension of the example embodiments utilizes the interface provided by the REST GUI protocol to receive communications between the front-end and the back-end. The web extension may subscribe to events via the REST-GUI protocol using a window message (e.g., a Window.POST message). Here, an initial subscription tells the backend/REST GUI side to provide the web extension with the state/position data of UI controls that are interacted with by a user on the front-end of the application. Then every time a new event occurs associated with that data, the web extension is notified by the backend and the web extension may forward pass the events to a recorder widget that is hosted locally on the client-side. For example, a recording widget may be running as a desktop application/studio agent. The recording widget can record each user interface interaction on the front-end. The recording widget may also provide a window that lists the recorded events in the order they are detected.

The recorded events can be used to build a bot that can understand the WebGUI application and automatically perform various business contexts on the user interface of the front-end of the application. WebGUI refers to the user interface that is output on the screen, while RESTGUI refers to the mechanism/interface that exposes the session between the client and the server executing the WebGUI application. In some embodiments, the user interactions may be performed on the client side, while the instructions are all executed on the server-side which has the logic there. The web extension may subscribe to events for the recorder from the server-side and the server-side can send notifications of events to the recorder as they occur in real-time. For example, the web extension can connect to the session between the front-end and the back-end via RESTGUI to capture user interactions on the user interface of the WebGUI application which can be stored in a file and exported to a development environment such as an integrated development environment (IDE) where the bot can quickly and easily be built in an automated manner.

RPA activities may be executed sequentially for attended bots. However, for an unattended bot, instructions for multiple activities being batched together will provide high performance. During bot execution, the system may generate an automation script for "playing" the bot. The automation script is typically designed to execute the instruction in sequence. However, sequential execution slows performance of the bot. In the example embodiments, the application can be enabled to batch together instructions for bot execution into one batched payload that can be simultaneously transmitted to the back-end of the application for processing/rendering of content. Some of the benefits of this system include significantly faster execution of the bot program (e.g., 10 times faster or more, etc.). Also, the batch process can easily be enabled/disabled during bot development or subsequently. Furthermore, the application can identify which instructions can be batched so that a user does not need to manually select instructions for batching.

The application may collect multiple activities which can be batched together at compile time and generate a batch method to do batching. When developing the bot, a development environment such as an IDE may provide an option to enable batching by selecting a button or other option/box to "optimize for faster execution" before generating an executable package for the bot. The package generation logic checks for modules of code and bot activities that can be batched together to generate the automation script with batching. According to various embodiments, the application may consume or otherwise have installed therein a software development kit (SDK) that contains logic for identifying which bot activities can be batched together and which bot activities cannot be batched together. When a batch activity is called from the SDK, the SDK may assemble all activities which are called as a callback sequentially without making automation request for each activity. Finally when all activities are collected and batched, it makes one call to backend for all batched activities and the responses are also returned in batch.

FIG. 1 illustrates a computing environment 100 for application development and bot execution in accordance with an example embodiment. In this example, the computing environment 100 may include a development environment that includes an integrated development environment (IDE) 111 where a bot can be developed for performing automated actions on a user interface of a front-end 120 of a software application. The development environment also includes a package generator 112 configured to generate an automation script 113 with a batch of instructions for executing the bot program. A user may access the IDE 111 and build the bot. In this environment, the IDE 111 may access a recorder (not shown) that records user interface actions as they are performed and converts them into a bot program that can be automatically executed/performed rather than a human having to enter the data.

The computing environment 100 also includes a runtime environment where the developed bot can be executed within a live runtime environment. Bot the development environment and the runtime environment are accessible to a desktop agent 114 which may be configured to batch together bot instructions based on batching characteristics/attributes of the bot instructions which are identified from a WebGUI SDK 115. Here, the desktop agent 114 may receive a list of activities to be performed by the bot from the IDE 111, identify which activities can be batched together based on the WebGUI SDK 115, and request the package generator 112 to generate the automation script 113 with such batched instructions. The batched instructions can be sent as a single payload to a back-end 130 of the application.

It should be appreciated that the computing environment 100 is just an example and it should also be appreciated that other elements or different elements not shown may be included in the computing environment 100. In this example, the software application may be a WebGUI application, or the like, which includes a client-side or the front-end 120 and a server-side or the back-end 130 which communicate with each other via a session (e.g., a web session, etc.) The session may be established via hypertext transfer protocol (HTTP) messages. In some embodiments, an authentication protocol may be performed between the front-end 120 and the back-end 130 to establish the session.

The IDE 111 provides a complete bot development environment for creating and testing a bot. In some embodiments, the IDE 111 may be an IDE for cloud applications hosted on a cloud platform which is the back-end 130. Meanwhile, the desktop agent 114 may be a hub that provides a central communication interface between the IDE 111, a WebGUI provider, a recorder, and the application (e.g., front-end 120 and the back-end 130) through a web extension 121 (e.g., CHROME® extension, etc.) that is integrated into the application itself through a WebGUI connector API 122. The web extension 121 may interact with the back-end 130 of the application using a WebGUI connector API 122. The recorder may use the web extension 121 to capture screen shots and content, metadata, establish a connection, disconnection, record interactions on application using RestGUI events, and the like. The WebGUI connector API 122 may define a common request/response json structure and be implemented an asynchronous interface. The WebGUI connector API 122 provides an API for creating the connection, closing the connection, subscribing to events for recording, executing batch bot info, and the like. The web extension may use these APIs to connect the recorder to the application and subscribe to recording events and executing the automation.

The WebGUI connector API 122 used by the web extension provides simple APIs for recording transactions running on a user interface. The WebGUI connector API 122 also provides APIs for capturing the current state of the application page and position of the UI elements/controls. These two APIs allow the web extension 121 to capture both the state of the page and the position of the actions/events and forward these to the recorder. Using these two pieces of information, the system can also reconstruct the events and build a bot.

During batching, the front-end 120 of the application may identify a group of bot actions that can be batched based on the WebGUI SDK 115. Here, the bot actions that can be batched are identified, and converted into bot programming code that can be used to execute the bot at the back-end 130. The bot actions can be batched into a single payload that is submitted to the back-end 130. In response, the back-end 130 may simultaneously process the batched instructions based on content and instructions stored in a data store 131. The back-end may send results of the execution of the batched instructions to the front-end 120 for rendering and execution on the user interface.

The system described herein may be implemented in the form of a software application that is part of an RPA suite of software. The software may transform WebGUI events into high level application-level descriptions of the activities. Furthermore, the system may transform the high level activities into WebGUI requests. By recording the events directly from the user interactions on the user interface, there are no risk of human errors. Furthermore, the amount of time that it takes to create a bot program can be reduced significantly because all of the steps may be automated and performed by a computer via an API connector, a recorder, and a mapping.

Figure 2A:
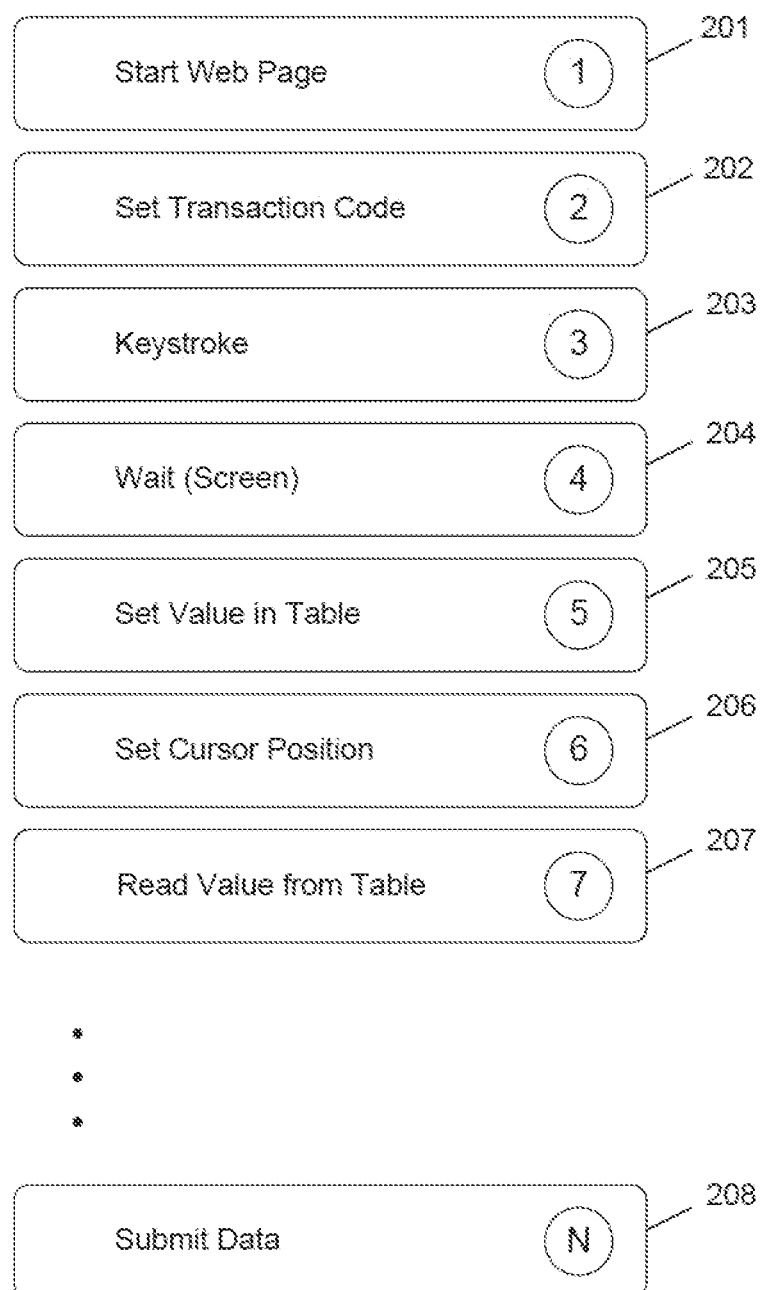
FIG. 2A is a diagram illustrating a sequence of recorded user interface events in accordance with an example embodiment.

FIG. 2A illustrates a list 200 of a sequence of recorded user interface events/actions 201, 202, 203, 204, 205, 206, 207, . . . 208, in accordance with an example embodiment. Referring to FIG. 2A, the list 200 includes different actions 201-208 that are performed via the user interface and recorded during bot development. When converted into a bot program, the sequence of actions may be performed as shown in FIG. 2A. Here, the actions in the list 200 may correspond to actions performed in sequence on the user interface. However, some or even all of the actions 201-208 may be capable of execution at the same time, rather than sequentially. In the example embodiments, the actions 201-208 may be analyzed by the application to determine whether or not they can be batched. For example, an application provider or other entity may generate a SDK with indicators therein that identify predefined bot actions that can be batched and predefined bot actions that cannot be batched.

Actions on the user interface may be actions that cannot be batched or actions that involve some dependency on another action or some other activity that prevents the action from being executed with the other actions. As an example, a waiting step may be performed while data loads. Here, the waiting step may require that the user interface not take an action for a predetermined amount of time (e.g., 15 seconds, etc.) This type of action cannot be batched with other actions because it is not an action that can be executed at the same time as other actions such as entering text into an input field, a keystroke, a button/box check, or the like. As another example, a bot may be programmed to read data from a database table and then enter the data into a field of the user interface. In this case, the data read and the data input cannot be performed at the same time because the output of the read step must be input to the data entry step. The SDK may identify which predefined actions can be performed as a batch, and which cannot.

Here, the user interface may be part of a client-side or front-end of the application. The user interface may include various input fields, buttons, checkboxes, menus, and the like, which can be interacted with by a user using input commands such as entered via a keyboard, a mouse, a finger, or other touch mechanism. Each field may include an identifier/name of the data field as well as a box or other field where data can be entered. The user interface may also include a submit button or other buttons and selectable actions. A bot may be programmed to enter data, check the boxes, read data, open and close pages, and the like. Therefore, it is possible to generate a bot program that automates various patterns of user interface interaction.

FIG. 2B illustrates a process 240 of breaking up the actions 201-208 in the list 200 of FIG. 2A, into a first subset 242 of batched actions, a second subset 244 of batched actions, and a third subset 246 of non-batched actions which cannot be performed with the batched actions. Referring to FIG. 2B, the application may refer to the SDK to determine which of the actions can be batched and which cannot. In particular, actions 201, 202, and 203, can be batched together in sequence while action 204 cannot be batched because it requires a wait action which cannot be completed until the first subset 242 of batched actions are completed. Furthermore, actions 205 and 206 can be batched together in sequence, but action 207 cannot be batched with actions 205 and 206 because action 207 requires a read of data that is stored by action 205. The process 240 may be performed by the desktop agent 114 shown in FIG. 1, however, embodiments are not limited thereto.

Intervening instructions which cannot be batched may be omitted from the batched instructions, but the sequence in which all the instructions are executed remains the same. In some embodiments, all of the instructions may not be grouped into only two sets of batchable and non batchable instructions. Instead, the system may create multiple groups of batchable instructions depending on the instructions present. For example, a bot program may include ten instructions. In this example, if instructions three and seven are not batchable, the system may generate a first group of batchable instructions including instructions one and two which are executed in a same batch. Then instruction three may be executed in a normal way. Next, instructions four, five and six may be batched into a second group and executed at the same time. Then, instruction seven can be executed in a normal way. Next, instructions eight to ten can be batched into a third group and executed at the same time.

The application may read an action description of a bot activity and compare it to a group of "authorized" bot activities for batching which are stored in the SDK. If the action description is included in the group of authorized bot activities, the application assigns the action to the batched subset of instructions. If, however, the action is not in the group of authorized bot activities, the action can be assigned to the non-batched subset of actions.

The batching can be enabled ahead of time. For example, a user may select a button or click on an option via a user interface of a development environment where the bot is developed to program the bot to perform batching. When batching is enabled, during runtime, the application looks for actions that can be batched and submits them to the application back-end for processing/rendering in a single payload. The application may restrict or otherwise limit the batching process to a single page of the application. In other words, the application may find all of the actions that can be batched together on the same page of the application.

FIG. 2C illustrates batch payloads 262 and 264 that are generated for a bot program in accordance with an example embodiment. Referring to FIG. 2C, the application may convert the actions that are to be performed by the bot, into executable instructions that can be executed by the back-end of the application and returned and rendered/executed via the user interface on the front-end of the application. Here, the actions 201, 202, and 203, are batchable and are converted into code modules 251, 252, and 253, respectively, which can be executed by the application and used to carry out the steps of the bot on the user interface. The conversion process may include mapping each action to a predefined code module and adding the code module to the batch payload 262. In addition, the actions 204 and 205 are converted into code modules 254 and 255 and added to the batch payload 264. When all of the actions have been converted into code and batched together, the front-end of the application may submit the batch payloads to the back-end. In response, the back-end may execute the instructions within a batch payload at the same time (simultaneously) rather than sequentially thereby reducing the amount of execution time for carrying out the bot.

FIG. 3A illustrates an example of bot programming code 300A without batching in accordance with an example embodiment, and FIG. 3B illustrates an example of bot programming code 300B with batching in accordance with an example embodiment. Referring to FIGS. 3A and 3B, the bot programming code 300A includes a series of instructions 301A, 302A, and 303A, which are executed one at a time in serial fashion. That is, the instruction 302A is not executed until the instruction 301A is completed execution.

Meanwhile, in FIG. 3B, there is a difference in the generated code between batchable and non batchable instructions. In particular, the set of instructions 301B, 302B, and 303B which can be batched together are enclosed within a batch method 304 as a callback while in the later ones are directly mentioned. The way of execution is different for both as mentioned in above point.

Figure 4:
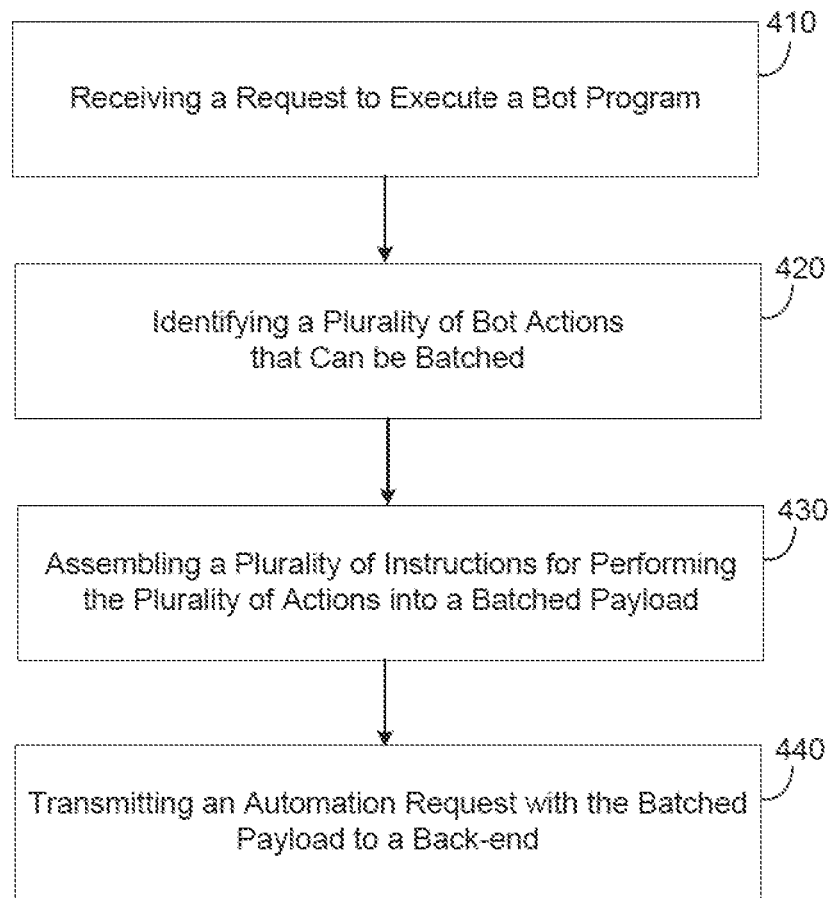
FIG. 4 is a diagram illustrating a method of batching instructions of a bot during execution in accordance with an example embodiment.

FIG. 4 illustrates a method 400 of batching instructions of a bot during execution in accordance with an example embodiment. As an example, the method 400 may be performed by a cloud platform, a web server, an on-premises server, a user device, a combination of devices, and the like. The method 400 may be an automated method that is performed by a software application. In other words, the commands may be predefined and issued by the software application during an automated recording process, an automated conversion process, and an automated bot generation process. Referring to FIG. 4, in 410, the method may include receiving a request to execute a bot program configured to perform a sequence of actions on a user interface of a software application. For example, the bot program may be configured to check boxes, input text, read data from storage/memory, open pages, and the like.

In 420, the method may include identifying a plurality of actions of the bot program that can be batched. As a non-limiting example, the method may include determining which actions of the bot program can be batched together based on batching attributes that are stored within a SDK of the application. In 430, the method may include assembling a plurality of instructions for performing the plurality of actions of the bot program into a batched payload. For example, the method may include compiling the plurality of instructions into one single payload that can be delivered as a single batch to the back-end. In 440, the method may include transmitting an automation request with the batched payload to a back-end of the application on a server.

In some embodiments, the identifying may include identifying a plurality of actions of the bot that are performed on a same page of the software application. In some embodiments, the identifying may include identifying a first subset of actions that can be batched and a second subset of actions that cannot be batched, and assembling instructions for only the first subset of actions into the batched payload. In some embodiments, the identifying may include identifying whether or not each action can be batched based on a software development kit (SDK) of the software application.

In some embodiments, the assembling may further include compiling the plurality of instructions for performing the plurality of actions into an executable package, and transmitting the executable package to the back-end server. In some embodiments, the method may further include receiving a batch of responses for performing the plurality of actions from the back-end server, and in response, executing the plurality of actions of the bot program via the software application based on the batch of responses. In some embodiments, the method may further include recording the sequence of actions on the user interface of the software application and converting the recorded sequence of actions into the bot program. In some embodiments, the method may further include verifying that batching was previously enabled via a development environment of the bot program.

Figure 5:
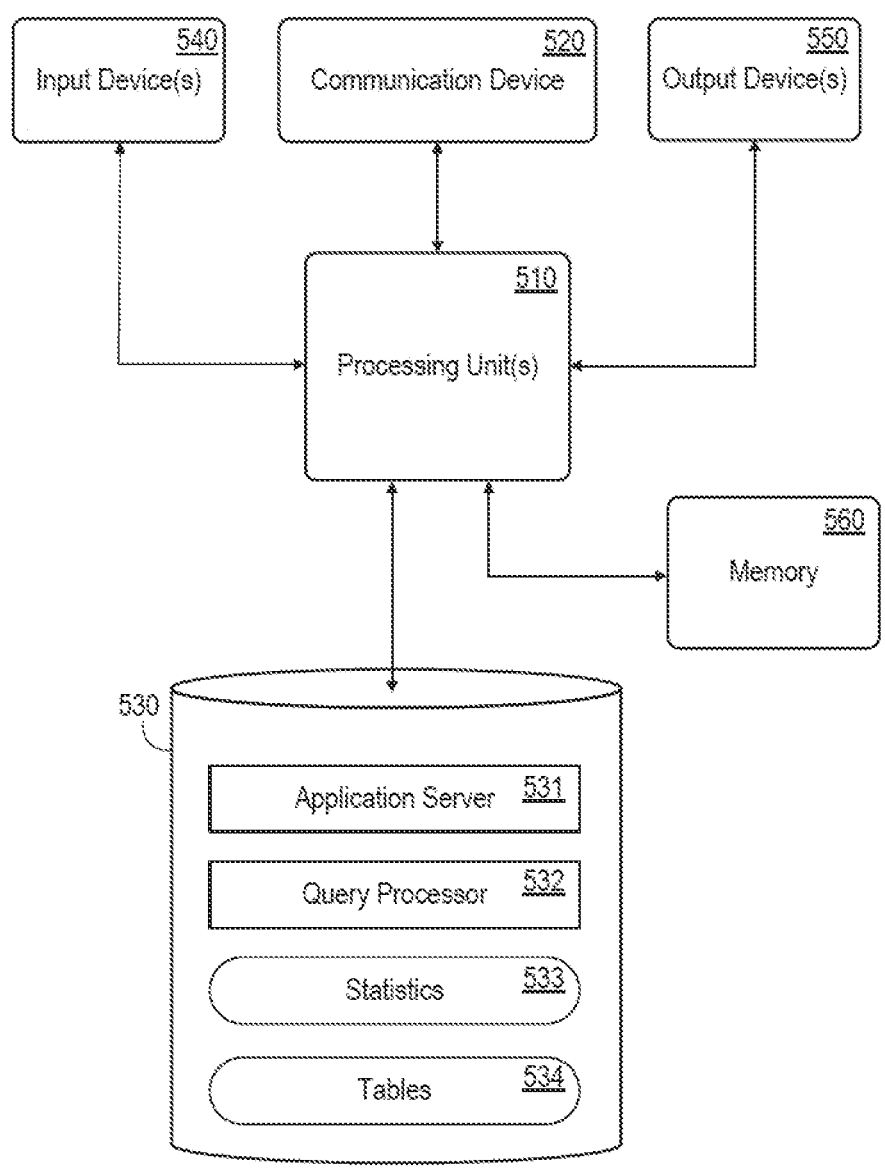
FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 5 is a diagram of a server node 500 according to some embodiments. The server node 500 may include a general-purpose computing apparatus and may execute program code to perform any of the functions described herein. The server node 500 may comprise an implementation of a remote terminal or a host platform, in some embodiments. It should also be appreciated that the server node 500 may include other unshown elements according to some embodiments and may not include all of the elements shown in FIG. 5. The server node 500 may perform the method 400 shown in FIG. 4.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include estimating selectivities of queries on tables 534 based on statistics 533. Embodiments are not limited to execution of these processes by a single computing device. Data storage device 530 may also store data and other program code for providing additional functionality and/or which are necessary for operation of server node 500, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory computer-readable medium that is capable of transmitting and/or receiving to such non-transitory computer readable media accessible via the Internet, cloud storage, or the Internet of Things (IoT). The article of manufacture containing the computer code may be made and/or used by executing the code directly from one medium, or by copying the code from one medium to another medium.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
receive a request to execute a bot configured to perform a sequence of intertwined actions on a user interface of a software application, at least some actions of the sequence of actions to be executed in a particular order;
identify a plurality of actions from the sequence of actions of the bot to be performed on the user interface based on attributes of the sequence of actions, wherein the sequence of actions contains a first plurality of actions that are batchable and a second plurality of actions that are not batchable;
read authorized bot activities that are batchable and authorized bot activities that are not batchable from a software development kit (SDK) and compare the plurality of actions to the authorized bot activities to identify a first subset of actions from among the plurality of actions that are capable of being batched to be executed in parallel and a second subset of actions from the plurality of actions that are incapable of being batched based on the authorized bot activities;

assemble instructions comprising programming code for executing the first subset of actions of the bot into a batched payload to be executed in parallel;

transfer the batched payload to a back-end of the software application;

receive batched execution results based on the execution, in parallel, of the batched payload via the back-end of the software application;

render the batched execution results on the user interface of the software application; and subsequent to transferring the batched payload, transfer and sequentially execute the second subset of actions via the back-end of the software application in the particular order.

2. The computing system of claim 1, wherein the processor is configured to identify the plurality of actions of the bot from a same page of the software application.

3. The computing system of claim 1, wherein the processor is configured to identify the first subset of actions from the plurality of actions that can be batched and the second subset of actions from the plurality of actions that cannot be batched based on the authorized bot activities, and assemble instructions for only the first subset of actions into the batched payload.

4. The computing system of claim 1, wherein the processor is configured to compile the programming code into an executable package with the batched payload, and transmit the executable package to the server.

5. The computing system of claim 1, wherein the processor is further configured to receive batched results of the execution from the server.

6. The computing system of claim 1, wherein the processor is further configured to record the plurality of actions on the user interface of the software application and convert the recorded plurality of actions into the bot.

7. The computing system of claim 1, wherein the processor is further configured to verify that batching was previously enabled via an integrated development environment (IDE) of the bot.

8. A method comprising:
receiving a request to execute a bot configured to perform a sequence of intertwined actions on a user interface of a software application, at least some actions of the sequence of actions to be executed in a particular order;

identifying a plurality of actions from the sequence of actions of the bot to be performed on the user interface based on attributes of the sequence of actions, wherein the sequence of actions contains a first plurality of actions that are batchable and a second plurality of actions that are not batchable;

reading authorized bot activities that are batchable from a software development kit (SDK) and authorized bot activities that are not batchable and compare the plurality of actions to the authorized bot activities to identify a first subset of actions from among the plurality of actions that are capable of being batched to be executed in parallel and a second subset of actions from the plurality of actions that are incapable of being batched based on the authorized bot activities;

assembling instructions comprising programming code for executing the first subset of actions of the bot into a batched payload to be executed in parallel;

transferring the batched payload to a back-end of the software application;

receiving batched execution results based on the execution, in parallel, of the batched payload via the back-end of the software application;

rendering the batched execution results on the user interface of the software application; and subsequent to transferring the batched payload, transferring and sequentially executing the second subset of actions via the back-end of the software application in the particular order.

9. The method of claim 8, wherein the identifying comprises identifying the plurality of actions of the bot from a same page of the software application.

10. The method of claim 8, wherein the identifying comprises identifying the first subset of actions from the plurality of actions that can be batched and the second subset of actions from the plurality of actions that cannot be batched based on the authorized bot activities, and assembling instructions for only the first subset of actions into the batched payload.

11. The method of claim 8, wherein the assembling further comprises compiling the programming code into an executable package with the batched payload, and transmitting the executable package to the server.

12. The method of claim 8, wherein the method further comprises receiving batched results of the execution from the server.

13. The method of claim 8, wherein the method further comprises recording the plurality of actions on the user interface of the software application and converting the recorded plurality of actions into the bot.

14. The method of claim 8, wherein the method further comprises verifying that batching was previously enabled via an integrated development environment (IDE) of the bot.

15. A non-transitory computer-readable medium comprising instructions which when executed by a processor cause a computer to perform a method comprising:
receiving a request to execute a bot configured to perform a sequence of intertwined actions on a user interface of a software application, at least some actions of the sequence of actions to be executed in a particular order;

identifying a plurality of actions from the sequence of actions of the bot to be performed on the user interface based on attributes of the sequence of actions, wherein the sequence of actions contains a first plurality of actions that are batchable and a second plurality of actions that are not batchable;

reading authorized bot activities that are batchable and authorized bot activities that are not batchable from a software development kit (SDK) and compare the plurality of actions to the authorized bot activities to identify a first subset of actions from among the plurality of actions that are capable of being batched to be executed in parallel and a second subset of actions from the plurality of actions that are incapable of being batched based on the authorized bot activities;

assembling instructions comprising programming code for executing the first subset of actions of the bot into a batched payload to be executed in parallel;

transferring the batched payload to a back-end of the software application;

receiving batched execution results based on the execution, in parallel, of the batched payload via the back-end of the software application;

rendering the batched execution results on the user interface of the software application; and subsequent to transferring the batched payload, transferring and sequentially executing the second subset of actions via the back-end of the software application in the particular order.

16. The non-transitory computer-readable medium of claim 15, wherein the identifying comprises identifying the plurality of actions of the bot from a same page of the software application.

17. The non-transitory computer-readable medium of claim 15, wherein the identifying comprises identifying the first subset of actions from the plurality of actions that can be batched and the second subset of actions from the plurality of actions that cannot be batched based on the authorize bot activities, and assembling instructions for only the first subset of actions into the batched payload.

* * * * *